Patented Oct. 15, 1929

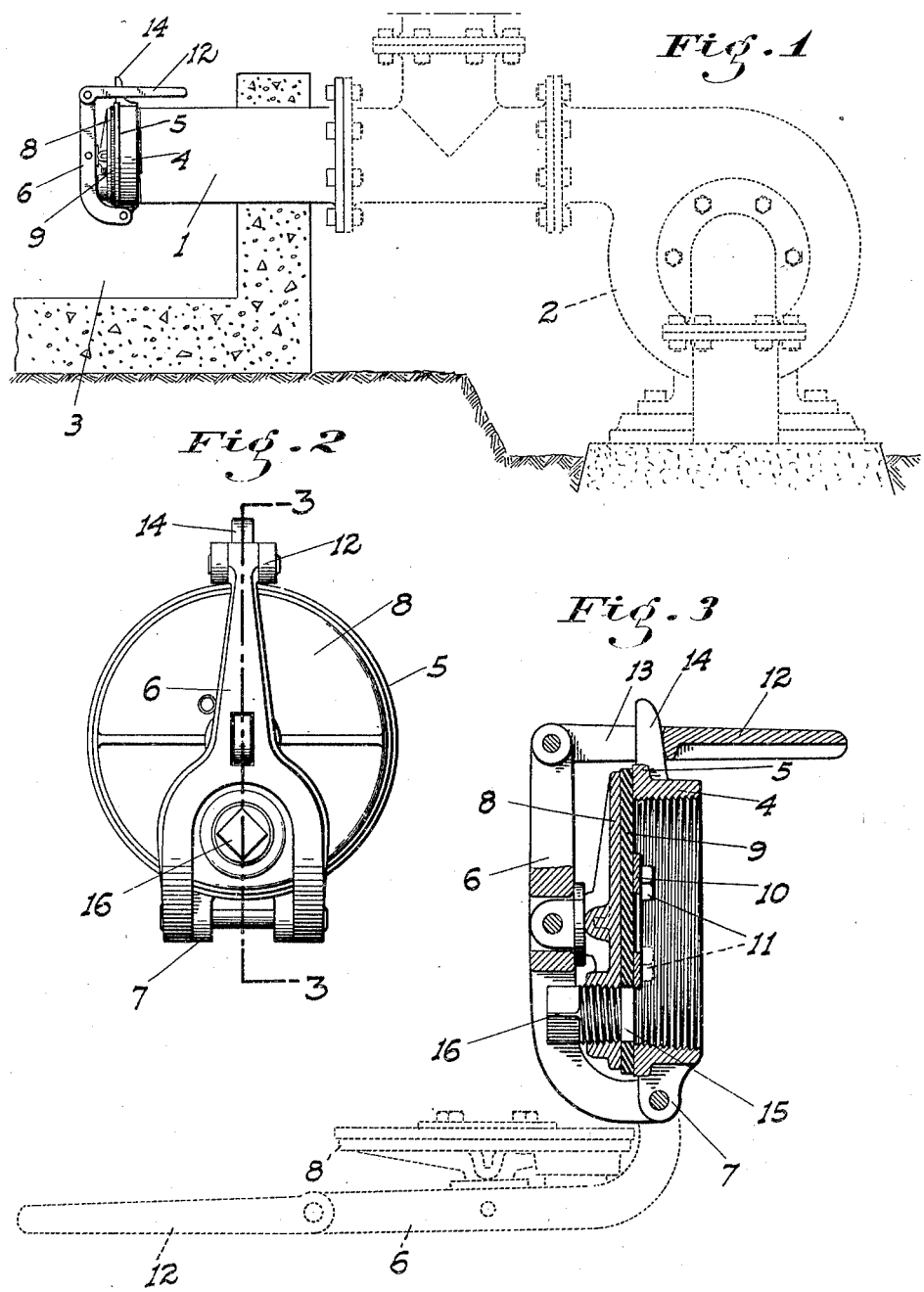

1,731,881

UNITED STATES PATENT OFFICE

ERLE L. VAN BUSKIRK, OF LODI, CALIFORNIA

VALVE

Application filed August 29, 1928. Serial No. 302,772.

This invention relates to improvements in valves and particularly to a type of valve to be used in connection with the outer end of an irrigation pipe which discharges into a ditch-sump or the like from the supply pump. Screw caps or the like are now ordinarily used for this purpose which are inconvenient to put on or take off, especially when the cap is submerged in the ditch-sump as is commonly the case. It is also hard to obtain a water tight fit or closure with devices of this character, unless great turning pressure is applied to the cap.

The principal object of my invention is to avoid the above objectionable features by providing a valve adapted to be permanently mounted on the end of a pipe and of such a nature that it may be very quickly opened and closed, and which when open will clear the pipe entirely so as to offer no obstruction to the full and free flow of the water. Also the valve has control means such that a great closing pressure may be had as is necessary to obtain a water tight seal against the pressure of the water, and such pressure may be easily and instantly obtained without the use of any tools.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views:

Fig. 1 is a side elevation of my improved valve mounted in place, in connection with an irrigation pipe.

Fig. 2 is an end view of the valve.

Fig. 3 is a vertical section on the line 3—3 of Figure 2.

Referring now more particularly to the characters of reference on the drawings, the numeral 1 denotes an open ended horizontal pipe leading from a pump 2 and discharging into a sump 3. The valve to be applied to the end of the pipe comprises a body which is in the form of a tapped collar 4 adapted to be screwed onto the pipe and having an enlarged flange 5 at its outer end so as to form a relatively wide flat surface seat.

An arm 6 whose lower end is forked and pivoted onto lugs 7 projecting radially from the bottom of the body, is bent a short distance from its lower end so as to normally extend substantially parallel to and some distance in front of the body. Pivotally connected to the arm in substantially the axial plane of the body and disposed between said arm and body, is a circular valve plate 8 which is faced on the inside with a continuous heavy gasket pad 9. This pad is preferably secured in place at the center by a metal ring 10 abutting against the exposed surface of the gasket and clamped to the plate by bolts 11. The gasket is of such size as to extend to the outer periphery of the seat flange 5 so as to bear firmly thereon throughout its full extent. The arm is swung up so that the gasket will be thus positioned and clamped against the seat by a lever 12, which is pivoted at one end to the upper end of the arm and has a vertical slot 13 at its pivoted end to receive a vertical cam lug 14 therein, which lug projects upwardly from and is rigid with the body. The lever is then in a substantially horizontal position above and extending lengthwise of the valve body and pipe.

To open the valve it is only necessary to raise the lever so as to clear the lug, when the pressure of the water in the pipe bearing against the gasket will cause the valve plate to swing out and down about the pivot of the arm 6 with the body as an axis, until clear of the pipe, either resting horizontally on the bottom of the sump or hanging straight down if the depth of the sump is sufficient. To close the valve the lever is raised and swung up over the top of the body to again engage the lug. A downward pressure on the lever without any pull when in this position causes the gasket to be drawn snugly against the body seat owing to the sloping surface of the cam lug.

It is therefore very easy as will be evident to obtain the necessary tight engagement of the gasket with the body flange, since if necessary the operator may bear his whole weight down on the lever in order to force the same home.

Due to the pivotal connection of the valve plate on the arm, said plate will always plumb itself with the seat, so that the pressure exerted by the lever as above described will cause the gasket to engage its seat with equal pressure throughout the contacting area.

In case it is desired to connect a relatively small hose or pipe to the large pipe 1, a tapped hole 15 is provided through the valve plate and gasket between the forks of the arm 6, said hole being normally closed by a plug 16. The valve structure in this instance is not intended to be opened, and serves for the time being as a reducing bushing.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. A closure device for an open-ended pipe comprising a collar adapted to be secured about the end of the pipe, an arm pivoted at one end on the collar at one side thereof, and adapted to extend in front of the collar in spaced and substantially parallel relation thereto, a valve plate connected to the arm between said arm and collar and adapted to cover the latter, a gasket on the face of the plate nearest the collar adapted to engage the outer edge of the same, and means applied to the arm for disengageably clamping the gasket against the collar.

2. A closure device for an open-ended pipe comprising a collar adapted to be secured about the end of the pipe, an arm pivoted at one end on the collar at one side thereof, and adapted to extend in front of the collar in spaced and substantially parallel relation thereto, a valve plate connected to the arm between said arm and collar and adapted to cover the latter, a gasket on the face of the plate nearest the collar adapted to engage the outer edge of the same, a lever pivoted onto the end of the arm opposite the pivot thereof and adapted to extend in superposed relation to the corresponding side of the collar, and a cam lug extending outwardly from the collar to removably project through a slot provided in the lever and adapted to engage the end of the slot farthest from the lever-pivot.

3. A closure device for an open-ended pipe comprising a collar adapted to be secured about the end of the pipe, an arm pivoted at one end on the collar at one side thereof, and adapted to extend in front of the collar in spaced and substantially parallel relation thereto, a valve plate connected to the arm between said arm and collar and adapted to cover the latter, a gasket on the face of the plate nearest the collar adapted to engage the outer edge of the same, and means applied to the arm for swinging the same to said parallel position and for then holding the arm against movement with the gasket clamped about the collar.

4. A structure as in claim 3, in which the plate is pivoted on the arm on an axis parallel to the arm pivot whereby to enable said plate and gasket to positively assume a position parallel to the outer edge of the collar when said arm is swung into position.

In testimony whereof I affix my signature.

ERLE L. VAN BUSKIRK.